United States Patent [19]

Bahl et al.

[11] Patent Number: 5,165,007
[45] Date of Patent: Nov. 17, 1992

[54] FENEME-BASED MARKOV MODELS FOR WORDS

[75] Inventors: Lalit R. Bahl, Amawalk; Peter V. DeSouza; Robert L. Mercer, both of Yorktown Heights; Michael A. Picheny, White Plains, all of N.Y.

[73] Assignee: International Business Machines Corporation, Armonk, N.Y.

[21] Appl. No.: 366,231

[22] Filed: Jun. 12, 1989

Related U.S. Application Data

[63] Continuation of Ser. No. 697,174, Feb. 1, 1985, abandoned.

[51] Int. Cl.⁵ .............................................. G10L 5/06
[52] U.S. Cl. ........................................... 395/2; 381/43
[58] Field of Search ................................. 381/41–50; 395/2

[56] References Cited

U.S. PATENT DOCUMENTS

| | | | |
|---|---|---|---|
| 4,032,710 | 6/1977 | Martin et al. | 381/43 |
| 4,156,868 | 5/1979 | Levinson et al. | 381/43 |
| 4,181,821 | 1/1980 | Pirz et al. | 381/43 |
| 4,319,085 | 3/1982 | Welch et al. | 381/45 |
| 4,383,135 | 5/1983 | Scott et al. | 381/45 |
| 4,555,796 | 11/1985 | Sakoe | 381/43 |
| 4,587,670 | 5/1986 | Levinson et al. | 381/43 |

OTHER PUBLICATIONS

Bahl et al., "A Maximum Likelihood Approach to Continuous Speech Recognition", IEEE Trans on Pattern Analysis and Machine Intelligence, vol. PAMI-5, No. 2, Mar. 1983, pp. 179–190.
IEEE Trans on acoustics, speech & signal processing, vol. ASSP-28, No. 2, Apr., 1980 "A Training Procedure for Isolated Word Recognition Systems" by Sadaoki Furui—pp. 129–136.
IEEE ASSP Magazine, Apr. 1984, pp. 4–29 "Vector Quantization" by Robert M. Gray.
Proceedings ICASSP, 1981, pp. 1153–1155 "Continuous Speech Recognition With Automatically Selected Acoustic Prototypes Obtained by Either Bootstrapping or Clustering" by A. Nadas et al.
Spoken Word Spotting Via Centisecond Acoustic States, R. Bakis, IBM Technical Disclosure Bulletin, vol. 18, No. 10, March 1976, pp. 3479–3481, New York, U.S.
Speacker Dependent Connected Speech Recognition Via Phonemic Markov Models, H. Bourlard et al., ICASSP '85, Tampa, Fla. U.S., 26th-29th Mar. 1985, vol. 3, pp. 1213–1216, IEEE New York, U.S.
IBM Research Report, #5971, Apr. 5, 1976 "Continuous Speech Recognition Via Centisecond Acoustic States" R. Bakis, pp. 1–8 and title page with abstract.
Proceedings of the IEEE, vol. 64, No. 4, Apr. 1976 "Continuous Speech Recognition by Statistical Methods" F. Jelinek pp. 532–556.
Reprinted from IEEE Trans. Acoust., Speech, and Signal Process., vol. ASSP-23, pp. 67–72, Feb. 1975, "Minimum Prediction Residual Principle Applied to Speech Recognition", by Fumitada Itakura.

Primary Examiner—Michael R. Fleming
Assistant Examiner—David D. Knepper
Attorney, Agent, or Firm—Marc D. Schechter

[57] ABSTRACT

In a speech recognition system, apparatus and method for modelling words with label-based Markov models is disclosed. The modelling includes: entering a first speech input, corresponding to words in a vocabulary, into an acoustic processor which converts each spoken word into a sequence of standard labels, where each standard label corresponds to a sound type assignable to an interval of time; representing each standard label as a probabilistic model which has a plurality of states, at least one transition from a state to a state, and at least one settable output probability at some transitions; entering selected acoustic inputs into an acoustic processor which converts the selected acoustic inputs into personalized labels, each personalized label corresponding to a sound type assigned to an interval of time; and setting each output probability as the probability of the standard label represented by a given model producing a particular personalized label at a given transition in the given model. The present invention addresses the problem of generating models of words simply and automatically in a speech recognition system.

2 Claims, 3 Drawing Sheets

FENEME-BASED MARKOV MODELS FOR WORDS

This is a continuation of application Ser. No. 697,174, filed Feb. 1, 1985.

FIELD OF INVENTION

The present invention is related to speech recognition, and more particularly to speech recognition systems using statistical Markov models for the words of a given vocabulary.

BACKGROUND OF THE INVENTION

In current speech recognition systems, there are two commonly used techniques for acoustic modeling of words. The first technique uses word templates, and the matching process for word recognition is based on Dynamic Programming (DP) procedures. Samples for this technique are given in an article by F. Itakura, "Minimum Prediction Residual Principle Applied to Speech Recognition," IEEE Transactions on Acoustics, Speech, and Signal Processing, Vol. ASSP-23, 1975, pp. 67-72, and in U.S. Pat. No. 4,181,821 to F. C. Pirz and L. R. Rabiner entitled "Multiple Template Speech Recognition System."

The other technique uses phone-based Markov models which are suited for probabilistic training and decoding algorithms. A description of this technique and related procedures is given in an article by F. Jelinek, "Continuous Speech Recognition by Statistical Methods," Proceedings of the IEEE, Vol. 64, 1976, pp. 532-556.

Three aspects of these models are of particular interest:

(1) Word Specificity—word templates are better for recognition because they are constructed from an actual sample of the word. Phonetics based models are derived from man-made phonetic baseforms and represent an idealized version of the word which actually may not occur;

(2) Trainability—Markov models are superior to templates because they can be trained, e.g. by the Forward-Backward algorithm (described in the Jelinek article). Word templates use distance measures such as the Itakura distance (described in the Itakura article), spectral distance, etc., which are not trained. One exception is a method used by Bakis which allows training of word templates (R. Bakis, "Continuous Speech Recognition Via Centisecond Acoustic States," IBM Research Report RC 5971, Apr. 1976).

(3) Computational Speed—Markov models which use discrete acoustic processor output alphabets are substantially faster in computational speed than Dynamic Programming matching (as used by Itakura) or continuous parameter word templates (as used by Bakis).

OBJECTS OF THE INVENTION

It is an object of the present invention to devise a method of acoustic modeling which has word specificity as with word templates but also offers the trainability that is available in discrete alphabet Markov models.

It is a further object to provide acoustic word models for speech recognition which are uncomplicated but allow high speed operation during the recognition processes.

DISCLOSURE OF THE INVENTION

According to the invention, for the generation of a word model, first an acoustic signal representing the word is converted to a string of standard labels from a discrete alphabet. Each label represents a respective time interval of the word. Each standard label is then replaced by a probabilistic (e.g. Markov) model to form a baseform model comprised of a number of successive models—one model for each standard label—without the probabilities yet entered. Such baseform models are then trained by sample utterances to generate the statistics or probabilities, to be applied to the models. Thereafter, the models are used for actual speech recognition.

Advantages of this method are that the generated word models are much more detailed than phone-based models while also being trainable; that the number of parameters depends on the size of the standard label alphabet and not on vocabulary size; and that probabilistic matching with these label-based models is computationally much faster than DP matching with word templates.

These advantages are notable with reference to a technique set forth in an IBM Research Report by Raimo Bakis entitled "Continuous Speech Recognition via Centisecond Acoustic States," dated Apr. 5, 1976. In the Bakis article, a word is defined as a sequence of states with each state being considered different. Hence, if each word is typically extended for sixty states and if the vocabulary were 5000 words, the technique disclosed by Bakis would have to consider 300,000 different states. In accordance with the present invention, each state is identified as corresponding to one label selected from 200 possible labels. The invention requires memory for the 200 labels which make up the words which can be stored simply as a sequence of numbers (each number representing a label) rather than for 300,000 states. In addition, less training data is required for the label-based model approach of the present invention. In the Bakis article approach, each word must be spoken to train for each speaker; with the invention, the speaker need utter only enough words to set values associated with 200 standard label models. It is also to be noted that the technique set forth in the Bakis article would treat two words—such as "boy" and "boys"—independently. According to the invention, much of the training relating to the standard labels for the word "boy" would also be applied for the word "boys".

The advantages of the invention will become even more apparent by the following presentation of an embodiment which is described with reference to drawings.

DETAILED DESCRIPTION PRINCIPLES OF INVENTION LABELING OF SPEECH INPUT SIGNAL

Figure 1:
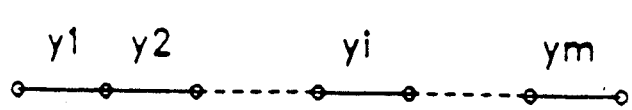
FIG. 1 is a schematic representation of a label string obtained for a word from an acoustic processor.

A preliminary function for speech recognition and model generation in this system is the conversion of the speech input signal into a coded representation. This is done in a procedure that was described for example, in "Continuous Speech Recognition with Automatically Selected Acoustic Prototypes Obtained by Either Bootstrapping or Clustering" by A. Nadas et al, Proceedings ICASSP 1981, pp. 1153-1155. For this conversion procedure, fixed-length centisecond intervals of the acoustic input signal are subjected to a spectral analysis, and the resulting information is used to assign to the respective interval a "label", or "feneme", from a finite set (alphabet) of labels each representing a sound type, or more specifically, a spectral pattern for a characteristic 10-millisecond speech interval. The initial selection of the characteristic spectral patterns, i.e., the generation of the label set, is also described in the above mentioned article, which is incorporated herein by reference.

In accordance with the invention, there are different sets of labels. First, there is a finite alphabet of "standard" labels. The standard labels are generated when a first speaker utters into a conventional acoustic processor—the processor applying conventional methods to perform clustering and labelling therefrom. The standard labels correspond to the first speaker's speech. When the first speaker utters each word in the vocabulary with the standard labels established, the acoustic processor converts each word into a sequence of standard labels. (See for example, TABLE 2 and FIG. 1.) The sequence of standard labels for each word is entered into storage. Second, there are sets of "personalized" labels. These "personalized" labels are generated by a subsequent speaker (the first speaker again or another) who provides speech input to the acoustic processor after the standard labels and sequences of standard labels are set.

The alphabet of standard labels and each set of personalized labels each preferably includes 200 labels although this number may differ. The standard labels and personalized labels are interrelated by means of probabilistic models associated with each standard label. Specifically, each standard label is represented by a model having (a) a plurality of states and transitions extending from a state to a state,
(b) a probability for each transition in a model, and
(c) a plurality of label output probabilities, each output probability at a given transition corresponding to the likelihood of the standard label model producing a particular personalized label at the given transition based on acoustic inputs from a subsequent "training" speaker.

The transition probabilities and label output probabilities are set during a training period during which known utterances are made by the training speaker. Techniques for training Markov models are known and are briefly discussed hereinafter.

An important feature of this labeling technique is that it can be done automatically on the basis of the acoustic signal and thus needs no phonetic interpretation.

Figure 5:
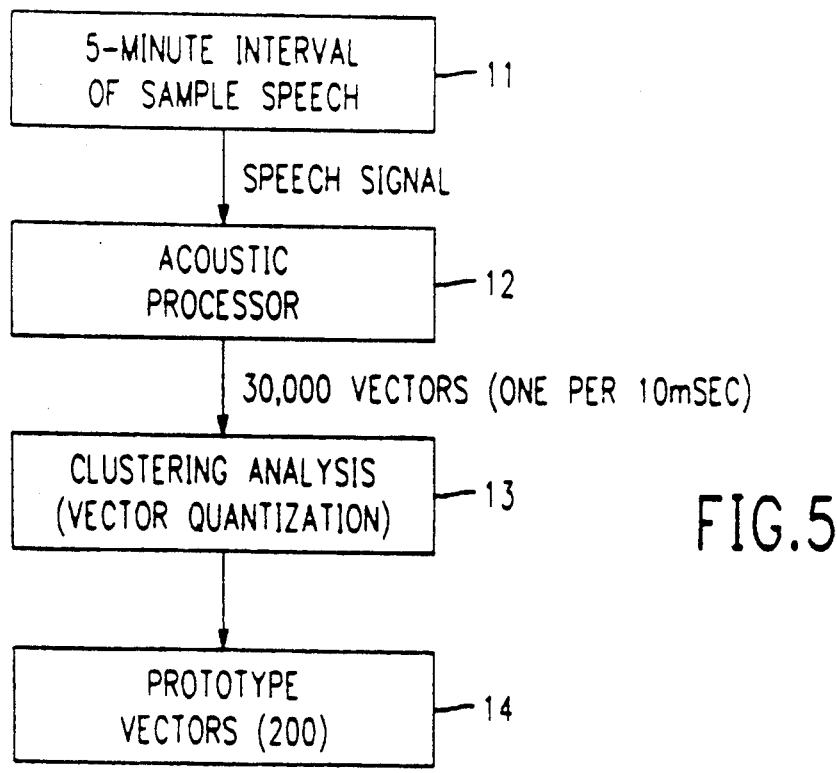
FIG. 5 is a block representation of the process for initial generation of a standard label alphabet.
Figure 6:
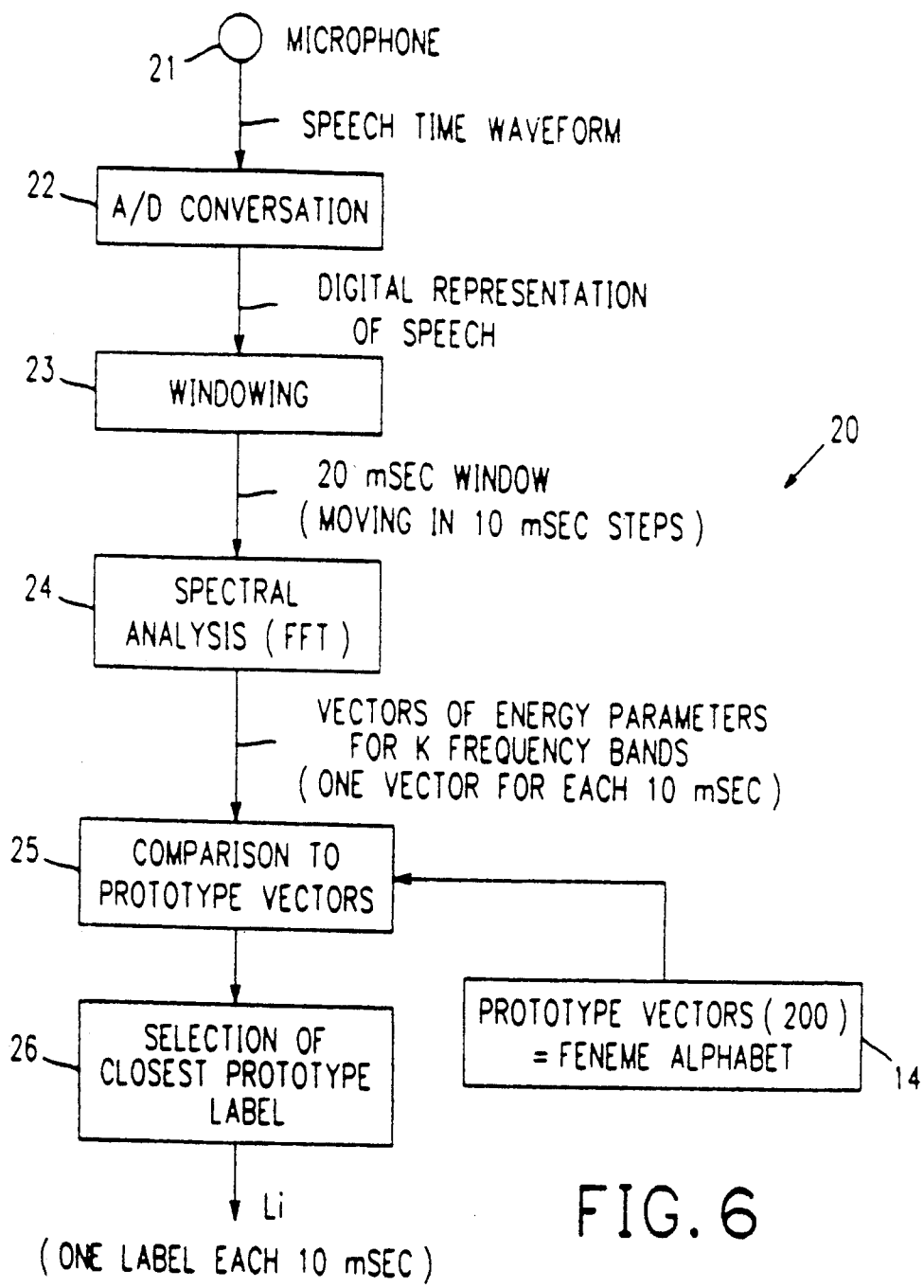
FIG. 6 is a block representation of the operation of the acoustic processor for deriving a personalized label string for a spoken word.

Some more details of the labeling technique will be presented in part in the "DETAILS OF THE EMBODIMENT" of this description with reference to FIGS. 5 and 6.

GENERATION OF FENEME-BASED WORD MODELS

The present invention suggests a novel method of generating models of words which is simple and automatic and which leads to a more exact representation than that using phone-based models. For generating the model of a word, the word is first spoken once and a string of standard labels is obtained by the acoustic processor. (See FIG. 1 for the principle and Table 2 for samples). Then each of the standard labels is replaced by an elementary Markov model (FIG. 2) which represents an initial and a final state and some possible transitions between states. The result of concatenating the Markov models for the labels is the model for the whole word.

This model can then be trained and used for speech recognition as is known for other Markov models from the literature, e.g. the above mentioned Jelinek article. The statistical model of each standard label is kept in storage as are, preferably, the word models formed thereof—the models being stored preferably in the form of tables, TABLE 3.

In TABLE 3, it is noted that each standard label model M1 through MN has three possible transitions—each transition having an arc probability associated therewith. In addition, each model M1 through MN has 200 output probabilities—one for each personalized label—at each transition. Each output probability indicates the likelihood that the standard label corresponding to model M1 produces a respective personalized label at a certain transition. The transition probabilities and output probabilities may vary from speaker to speaker and are set during the training period. If desired, the transition probabilities and output probabilities may be combined to form composite probabilities, each indicating the likelihood of producing a prescribed output with a prescribed transition occurring.

For a given word, the utterance thereof by a first speaker determines the order of labels and, thus, the order of models corresponding thereto. The first speaker utters all words in the vocabulary to establish the respective order of standard labels (and models) for each word. Thereafter, during training, a subsequent speaker utters known acoustic inputs—preferably words in the vocabulary. From these utterances of known acoustic inputs, the transition probabilities and output probabilities for a given speaker are determined and stored to thereby "train" the model. In this regard, it should be realized that subsequent speakers need utter only so many acoustic inputs as is required to set the probabilities of the 200 models. That is, subsequent speakers need not utter all words in the vocabulary but, instead, need utter only so many acoustic inputs as necessary to train the 200 models.

Employing the label-based models is of further significance with regard to adding words to the vocabulary. To add a word to the vocabulary, all that is required is that the sequence of labels be determined—as by the utterance of the new word. In that the label-based models (including probabilities for a given speaker) have previously been entered in storage, the only data required for the new word is the order of labels.

The advantage of this model is that it is particularly simple and can easily be generated. Some more details will be given in the following portion of this description.

DETAILS OF AN EMBODIMENT

Model Generation and Recognition Process Overview

Figure 4:
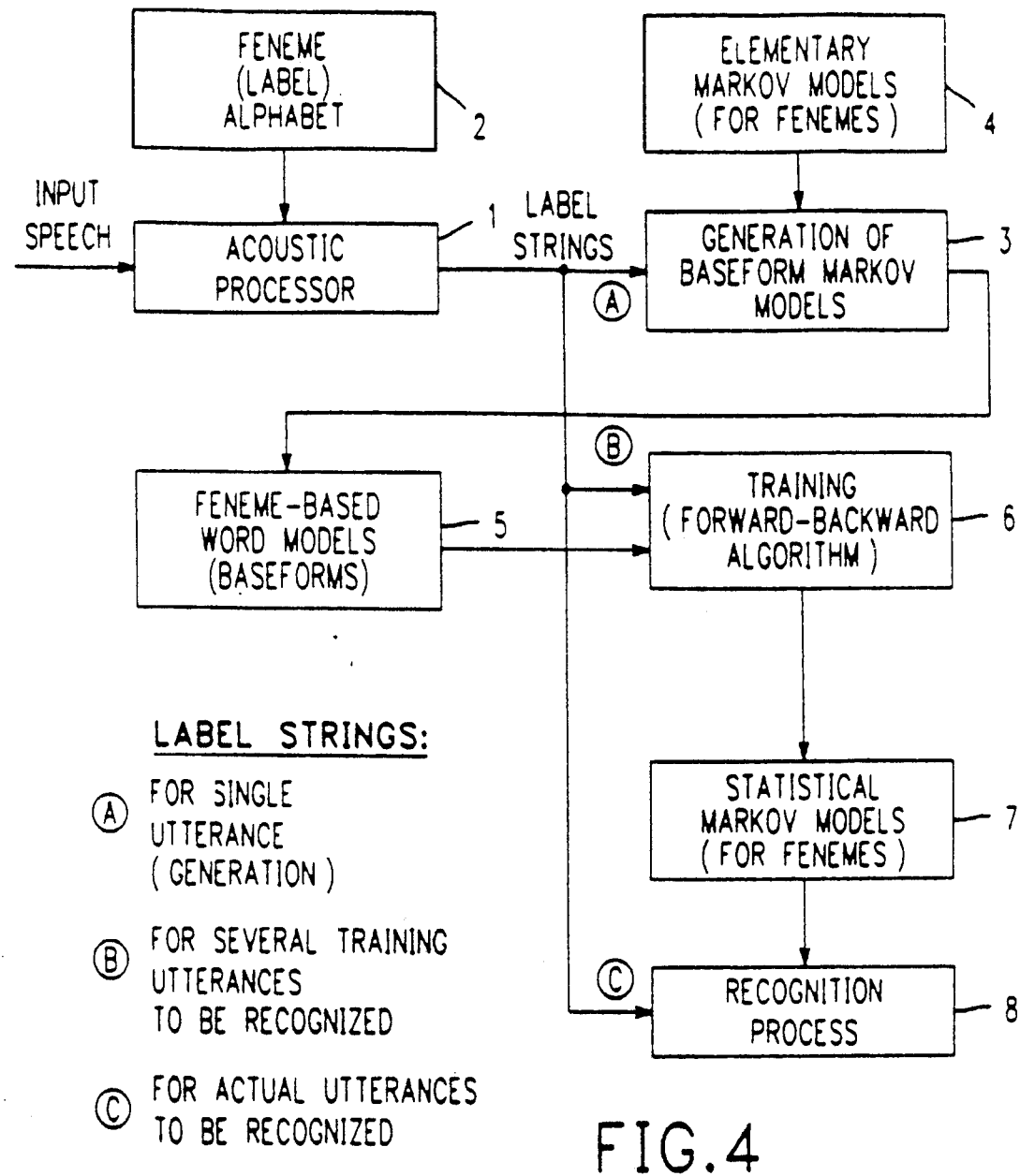
FIG. 4 is a block diagram of the model generation and recognition procedure according to the invention.

FIG. 4 is an overview of the speech recognition system, including model generation according to the invention and actual recognition.

Input speech is converted to label strings in the acoustic processor (1), using a previously generated standard label alphabet (2). In an initial step (3), a Markov model is generated for each word, using the string of standard labels caused by the initial single utterance of each word and previously defined elementary feneme Markov models (4). The label-based Markov models are intermediately stored (5). Thereafter, in a training step (6), several utterances of words (or other acoustic input) by a subsequent speaker are matched against the label-based models to generate the statistics relating to the probability values for transitions and personalized label outputs for each model. In particular, labels generated by the acoustic processor 1 for several training utterances to be recognized (see B in FIG. 4) and word models stored in element 5 enter a training element 6 which applies the well-known forward backward algorithm to the inputs. The forward-backward algorithm is discussed in detail in Appendix III of "Continuous Speech Recognition by Statistical Methods" by F. Jelinek, *Proceedings of IEEE,* vol. 64, no. 4, Apr. 1976, pp 532–556. In an actual recognition operation, strings of personalized labels resulting from utterances to be recognized are matched against the statistical label-based models of words, and identifiers for the word or words having the highest probability of producing the string of personalized labels are furnished at the output.

LABEL VOCABULARY GENERATION AND CONVERSION OF SPEECH TO LABEL STRINGS

The procedure for generating an alphabet of labels, and the actual conversion of speech into label strings will now be described with reference to FIGS. 5 and 6 (though descriptions are also available in the literature, e.g., the above mentioned Nadas et al, article).

For generating the standard labels which typically represent prototype vectors of sound types (or more specifically spectral parameters) of speech, a speaker talks for about five minutes to obtain a speech sample (box 11 in FIG. 5). In an acoustic processor (of which more details are discussed in connection with FIG. 6), 30,000 vectors of speech parameters are obtained (box 12), each for one 10 millisecond interval of the sample speech. These vectors are then processed in an analysis or vector quantization operation to group them in ca. 200 clusters, each cluster containing closely similar vectors (box 13). Such procedures are already disclosed in the literature, e.g., in an article by R. M. Gray, "Vector Quantization," IEEE ASSP Magazine, Apr. 1984, pp. 4–29.

For each of the clusters, one prototype vector is selected, and the resulting 200 prototype vectors are then stored for later reference (box 14). Each such vector represents one acoustic element or label. A typical label alphabet is shown in TABLE 1.

FIG. 6 is a block diagram 20 of the procedure for acoustic processing of speech to obtain label strings for utterances. The speech from a microphone (21) is converted to digital representation by an A/D converter (22). Windows of 20 msec duration are then extracted from the digital representation (23) and the window is moved in steps of 10 msec (to have some overlap). For each of the windows, a spectral analysis is made in a Fast Fourier Transform (FFT) to obtain for each interval representing 10 msec of speech a vector whose parameters are the energy values for a number of spectral bands (box 24 in FIG. 6). Each current vector thus obtained is compared to the set of prototype vectors (14) that were generated in a preliminary procedure described above. In this comparison step 25, the prototype vector which is closest to the current vector is determined, and the label or identifier for this prototype is then issued at the output (26). Thus, there will appear at the output one label every 10 msec, and the speech signal is available in coded form, the coding alphabet being the 200 feneme labels. In this regard, it should be noted that the invention need not be limited to labels generated at periodic intervals, it being contemplated only that each label corresponds to a respective time interval.

GENERATION OF WORD MODELS USING LABEL STRINGS

For the generation of the word models, each word that is required in the vocabulary is uttered once and converted to a standard label string as explained above. A schematic representation of a label string of standard labels for one word is shown in FIG. 1, consisting of the sequence y1, y2, ... ym which appeared at the output of the acoustic processor when the word is spoken. This string is now taken as the standard label baseform of the respective word.

To produce a basic model of the word which takes into account the variations in pronunciation of the word, each of the fenemes $y_i$ of the baseform string is replaced by an elementary Markov model $M(y_i)$ for that feneme.

Figure 2:
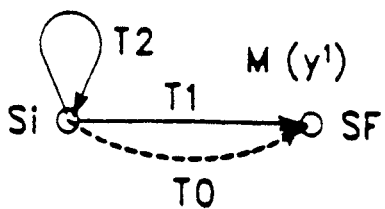
FIG. 2 shows an elementary Markov model for one label.

The elementary Markov model can be of extremely simple form as shown in FIG. 2. It consists of an initial state Si, a final state Sf, a transition T1 leading from state Si to state Sf and representing one personalized label output, a transition T2 leaving and returning to, the initial state Si, also representing one personalized label output, and a null transition T0 from the initial to the final state, to which no personalized label output is assigned. This elementary model accounts for (a) a single appearance of the personalized label by taking only transition T1; (b) several appearances of a personalized label by taking transition T2 several times; and (c) the representation of a missing personalized label by taking the null transition T0.

The same elementary model as shown in FIG. 2 can be selected for all 200 different standard labels. Of course, more complicated elementary models can be used, and different models can be assigned to the various standard labels but for the present embodiment the model of FIG. 2 is used for all standard labels.

Figure 3:
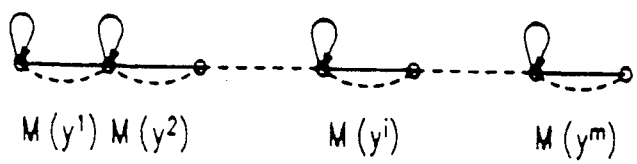
FIG. 3 is a baseform for a word, generated by replacing each standard label of the string shown in FIG. 1 by an elementary Markov model.

The complete baseform Markov model of the whole word whose label-based baseform is presented in FIG. 1 is illustrated in FIG. 3. It consists of a simple concatenation of the elementary models $M(y_i)$ for all standard labels of the word, the final state of each elementary model being joined with the initial state of the following elementary model. Thus, the complete baseform Markov model of a word that caused a string of m standard labels will comprise m elementary Markov models. The typical number of standard labels per word (and thus the number of states per word model) is about 30 to 80. Labels for four words are illustrated in TABLE 2. The word "thanks", for example, begins with the label PX5 and ends with PX2.

To generate a baseform Markov model for a word means to define the different states and transitions and their interrelation for the respective word. To be useful for speech recognition, the baseform model for the word must be made a statistical model by training it with several utterances i.e., by accumulating statistics for each transition in the model.

Since the same elementary model appears in several different words, it is not necessary to have several utterances of each word in order to train the models.

Such training can be made by the so called "Forward-Backward algorithm," which has been described in the literature, e.g., in the already mentioned paper by Jelinek.

As a result of the training, a probability value is assigned to each transition in the model. For example, for one specific state there may be a probability value of 0.5 for T1, 0.4 for T2, and 0.1 for T0. Furthermore, for each of the non-null transitions T1 and T2, there is given a list of probabilities indicating for each of the 200 personalized labels what the probability of its appearance is when the respective transition is taken. The whole statistical model of a word takes the form of a list or table as shown in TABLE 3. Each elementary model or standard label is represented by one section in the table, and each transition corresponds to a line or vector whose elements are the probabilities of the individual personalized labels (and in addition the overall probability that the respective transition is taken).

For actual storage of all word models, the following is sufficient: one vector is stored for each word, the vector components being the identifiers of the elementary Markov models of which the word consists; and one statistical Markov model including the probability values stored for each of the 200 standard labels of the alphabet. Thus, the statistical word model shown in TABLE 3 need not actually be stored as such in memory; it can be stored in a distributed form with data being combined as needed.

RECOGNITION PROCESS

For actual speech recognition, the utterances are converted to strings of personalized labels as was explained in the initial section. These personalized label strings are then matched against each word model to obtain the probability that a string of personalized labels was caused by utterance of the word represented by that model. Specifically, matching is performed based on match scores for respective words, wherein each match score represents a "forward probability" as discussed in the above-identified Jelinek article. The recognition process employing label-based models is analogous to known processes which employ phone-based models. The word or words with the highest probability is (are) selected as output.

CONCLUSION

Changing of Label Alphabet

It should be noted that the standard label alphabet used for initial word model generation and personalized label sets used for training and for recognition may be, but typically, are not all identical. However, although the probability values associated with labels generated during recognition may differ somewhat from personalized labels generated during training, the actual recognition result will generally be correct. This is possible because of the adaptive nature of the Markov models.

It should, however, also be noted that inordinately large changes in respective training and recognition alphabets may affect accuracy. Also, a subsequent speaker whose speech is vastly different from the first speaker will train the models with probabilities that may result in limits on accuracy.

The advantages of the label-based Markov models introduced by the present invention can be summarized as follows:

(a) these models are an improvement on phone-based models because they represent the word at a much more detailed level;

(b) unlike word templates using DP matching, label-based word models are trainable using the Forward-Backward algorithm;

(c) the number of parameters depends on the size of the feneme alphabet and not on vocabulary size—storage requirements growing slowly with an increase in vocabulary size;

(d) the recognition procedure using label-based models is computationally much faster than Dynamic Programming matching and the usage of continuous parameter word templates; and (e) the modelling of words is done automatically.

In addition to the variations and modifications to applicant's disclosed apparatus which have been suggested, many other variations and modifications will be apparent to those skilled in the art, and accordingly, the scope of applicant's invention is not to be construed to be limited to the particular embodiments shown or suggested.

For example, although shown preferably as a single acoustic processor, the processing functions may be distributed over a plurality of processors including, for example: a first processor initially determining the alphabet of standard labels; a second processor for producing a sequence of standard labels for each word initially spoken once; a third processor for selecting an alphabet of personalized labels; and a fourth processor for converting training inputs or words into a string of personalized labels.

We claim:

1. An apparatus for modeling words, said apparatus comprising:

means for measuring the value of at least one feature of an utterance of a first word, said utterance occurring over a series of successive time intervals of equal duration $\Delta t$, said means measuring the feature value of the utterance during each time interval to produce a series of feature vector signals representing the feature values;

means for storing a finite set of probabilistic model signals, each probabilistic model signal representing a probabilistic model of a component sound, each probabilistic model comprising a Markov model having (a) only first and second states, (b) a first transition extending from the first state to the second state, (c) a second transition extending from the first state back to itself, (d) a null transition extending from the first state to the second state, (e)

a transition probability for each transition, (f) an output probability for each output signal belonging to a finite set of output signals that the output signal will be produced at the first transition, (g) an output probability for each output signal that the output signal will be produced at the second transition, and (h) an output probability of zero for each output signal that the output signal will be produced at the null transition, each output signal of each Markov model representing the value of at least one feature of an utterance measured over a time interval having a duration substantially equal to $\Delta t$;

means for storing a finite set of training label vector signals, each training label vector signal having an associated probabilistic model signal, each training label vector signal having at least one parameter value;

means for comparing the feature value, of each feature vector signal in the series of feature vector signals produced by the measuring means as a result of the utterance of the first word, to the parameter values of the training label vector signals to determine, for each feature vector signal, the closest associated training label vector signal;

means for forming a baseform of the first word from the series of feature vector signals by substituting, for each feature vector signal, the closest associated training label vector signal to produce a baseform series of training label vector signals; and means for forming a probabilistic model of the first word from the baseform series of training label vector signals by substituting, for each training label vector signal, the associated probabilistic model signal to produce a series of probabilistic model signals.

2. A method of modeling words; said method comprising the steps of:

measuring the value of at least one feature of an utterance of a first word, said utterance occurring over a series of successive time intervals of equal duration $\Delta t$, said measuring step comprising measuring the feature value of the utterance during each time interval to produce a series of feature vector signals representing the feature values;

storing a finite set of probabilistic model signals, each probabilistic model signal representing a probabilistic model of a component sound, each probabilistic model comprising a Markov model having (a) only first and second states, (b) a first transition extending from the first state to the second state, (c) a second transition extending from the first state back to itself, (d) a null transition extending from the first state to the second state, (e) a transition probability for each transition, (f) an output probability for each output signal belonging to a finite set of output signals that the output signal will be produced at the first transition, (g) an output probability for each output signal that the output signal will be produced at the second transition, and (h) an output probability of zero for each output signal that the output signal will be produced at the null transition, each output signal of each Markov model representing the value of at least one feature of an utterance measured over a time interval having a duration substantially equal to $\Delta t$;

storing a finite set of training label vector signals, each training label vector signal having an associated probabilistic model signal, each training label vector signal having at least one parameter value;

comparing the feature value, of each feature vector signal in the series of feature vector signals produced by the measurement of the utterance of the first word, to the parameter values of the training label vector signals to determine, for each feature vector signal, the closest associated training label vector signal;

forming a baseform of the first word from the series of feature vector signals by substituting, for each feature vector signal, the closest associated training label vector signal to produce a baseform series of training label vector signals; and forming a probabilistic model of the first word from the baseform series of training label vector signals by substituting, for each training label vector signal, the associated probabilistic model signal to produce a series of probabilistic model signals.

* * * * *